United States Patent [19]

Leach et al.

[11] Patent Number: 5,439,632
[45] Date of Patent: Aug. 8, 1995

[54] PROCESS FOR PRETREATMENT OF NON-ISOTROPIC CYLINDRICAL PRODUCTS

[75] Inventors: David C. Leach, Orange, Calif.; John Barnes, Doncaster, England

[73] Assignee: ICI Composites, Inc., Tempe, Ariz.

[21] Appl. No.: 14,187

[22] Filed: Feb. 5, 1993

[51] Int. Cl.6 .................. B29C 33/76; B29C 67/20
[52] U.S. Cl. ................................................ 264/313
[58] Field of Search .............................. 264/257, 313

[56] References Cited

U.S. PATENT DOCUMENTS 5,061,418 10/1991 Ware .............................. 264/257 X Primary Examiner—Leo B. Tentoni
Attorney, Agent, or Firm—Michael J. Kline

[57] ABSTRACT

A method of preconditioning a non-isotropic composite cylindrical member. The method involves fitting the cylindrical member onto a mandrel having an outside diameter greater than the inside diameter of the cylindrical member and heating the mandrel and cylindrical member to a temperature sufficient to cause thermal deformation of the mandrel and substantially irreversible thermal deformation of the cylindrical member.

18 Claims, 5 Drawing Sheets

PROCESS FOR PRETREATMENT OF NON-ISOTROPIC CYLINDRICAL PRODUCTS

FIELD OF THE INVENTION

The present invention relates to a method of preconditioning a cylindrical member fabricated from a composite of a thermoplastic resin and a reinforcing fiber. More particularly, the invention relates to a method of preconditioning cylindrical non-isotropic thermoplastic members to avoid "creep" or other time dependant deformation when such members are used at elevated temperatures.

BACKGROUND OF THE INVENTION

Many structural components which traditionally have been fabricated from metals are being replaced by their polymeric counterparts. For example, unidirectionally reinforced graphite fiber/epoxy composite is often used in aerospace structural applications. The main advantage of using polymeric materials lies in the ease of production of complicated parts, simple assembly, fewer parts, and fewer finishing operations. Another major advantage, in aerospace applications, is the lower density of polymer composites as. compared to metal, which results in higher specific properties (i.e., performance per pound of material) for polymer composites.

The use of thermoplastic matrix composites for aircraft structures offers advantages over the more conventional epoxy composites, including reduced sensitivity to moisture effects and improved impact performance.

A highly preferred thermoplastic resin is PEEK. This material, a polyether etherketone resin, when reinforced with approximately 60% carbon fiber, yields a composite material stronger and lighter than many aluminum alloys.

Polyether etherketone (PEEK) resin/carbon fiber (CF) composites are, accordingly, being used in wear resistant applications, including aerospace applications. Continuous fiber reinforced pre-preg can be fabricated into tubes, which can be sectioned and machined into bearings, washers, wear rings, bushings, etc., for use in pumps, centrifuges, compressors, and similar equipment. The PEEK/CF-type composites offer other advantages over other materials, including: the ability to tighten clearances, and hence improve efficiencies of pumping; good wear resistance even at high temperatures; resistance to aggressive environments; and the ability to run dry without catastrophic failure.

A number of problems with thermoplastic polymers have precluded their being used more extensively as a replacement for more conventional metals. One of the primary concerns in the use of polymer composites is the time dependent response of polymeric materials. So-called "creep deformation" is significant in many polymers, even at room temperature, and is rapidly accelerated by small increases in temperature. A 50° C. rise in temperature above room temperature could have a catastrophic effect on the life of polymeric parts, but little effect on their metallic counterparts. Creep response is also affected by the physical aging of polymers, a phenomenon where the polymer exhibits volume and enthalpy relaxation with time even at temperatures below the glass-rubber transition temperature ($T_g$) of the polymer.

The molecular structure of thermoplastic polymers is different from that of traditional materials, such as metals, in that the polymeric macromolecules are held together by weaker secondary bonds as opposed to the strong metallic bonds in metals. Consequently, the conformation of the molecules changes continually as a result of the thermal energy contained in the system. When subjected to an external stress, rearrangements on a local scale take place fairly rapidly but those on a larger scale occur rather slowly. These long-scale rearrangements are referred to as the "creep" response. The distribution in the molecular weight of the polymers leads to a wide range of time scale over which the "creep" behavior of polymers is observed. The term "time-dependent" behavior is often used synonymously for "creep" behavior. The term, however, has a more general connotation and is also used to describe the "stress-relaxation" response of polymers.

In certain circumstances, thermoplastic composites are known to undergo a permanent, irrevocable deformation when held under constant load, a phenomenon which is also usually referred to as "creep." This phenomenon is well documented. See, e.g.:

A. Horoschenkoff, J. Brandt, J. Warnecke and O. S. Bruller "Creep Behaviour of Carbon Fibre Reinforced Polyetheretherketone and Epoxy Resin" SAMPE Conference, Milan "New Generation Materials and Processes" 339–349 (1988);

C. Hiel "Creep and Creep Recovery of a Thermoplastic Resin and Composite" Proc. AM. Soc. for composites 3rd Technical Conf. 558–563 Technomic Publishing (1988);

D. H. Nguyen, S. F. Wang and A. A. Ogale "Compressive and Flexural Creep Deformation in Thermoplastic Composites" 34th International SAMPE Symposium 1275–1282 (1989); and A. A. Ogale "Creep Behaviour of Thermoplastic Composites" in 'Thermoplastic Composite Materials', Ed. L A Carlsson; Elsevier (1991), all of which are incorporated in their entireties by reference herein.

In many applications it is necessary to "interference fit" the thermoplastic composite bearing or other cylindrical member onto a metal shaft in order to retain it in location; this interference fit must be retained over the operating temperature of the equipment. Users of such products have identified a problem in which PEEK/CF wear rings, for example, when interference fitted onto a shaft at room temperature and subsequently run at temperatures of up to 450° F. subseqeuntly lose the interference fit at room temperature, resulting in the ring moving along the shaft due to the differential pressure across the pump, and a consequent loss in efficiency of the pump.

The existence of a creep deformation in the mode required to cause an increase in inner diameter of a thermoplastic cylinder, however, is unexpected. There appears to be no information available in the prior art directly pertaining to the phenomenon in thermoplastics, and there is little, if any, information regarding this creep phenomenon in other composite materials.

Accordingly, it would be desirable to provide a method of preconditioning thermoplastic cylindrical members fitted on shafts to avoid the irrecoverable deformation or "creep" which plagues the existing state of the art.

SUMMARY OF THE INVENTION

The present invention solves the aforementioned problem of creep. A method of preconditioning a cylindrical thermoplastic member capable of being fitted onto a mandrel to create an interference fit at minimum operationing temperature is disclosed, in which the mandrel has an outside diameter greater than the inside diameter of the cylindrical member. The cylindrical member comprises a non-isotropic composite of a thermoplastic resin and a reinforcing fiber. The mandrel has a higher radial coefficient of thermal expansion (CTE) than that of the non-isotropic cylindrical member and, at the operating temperature, has an outside diameter greater than the inside diameter of the cylindrical member. The cylindrical member is fitted onto the mandrel, for example, by cooling the mandrel and/or the cylindrical member such that the normally smaller diameter cylindrical member may be fitted on the mandrel. The mandrel is then heated to an elevated temperature sufficient to cause thermal deformation of the mandrel and the cylindrical member. As a result of the pressure that is applied to the cylindrical member from the thermal expansion of the mandrel, and the decrease in diameter of the cylindrical member caused by its own thermal expansion, a permanent increase in the internal diameter of the cylindrical member results, producing an "annealed" cylindrical member that retains its tight fit on the mandrel after being cooled and during operating (elevated) temperatures. Thus, the "creep" phenomenon is eliminated.

These and other advantages of the present invention will become more readily apparent as the following detailed description of the preferred embodiments proceeds.

BRIEF DESCRIPTION OF THE DRAWINGS

In the accompanying drawings, the preferred embodiments of the invention and preferred methods of practicing the invention are illustrated, in which.

DETAILED DESCRIPTION OF THE PREFERRED EMBODIMENTS

Figure 1:
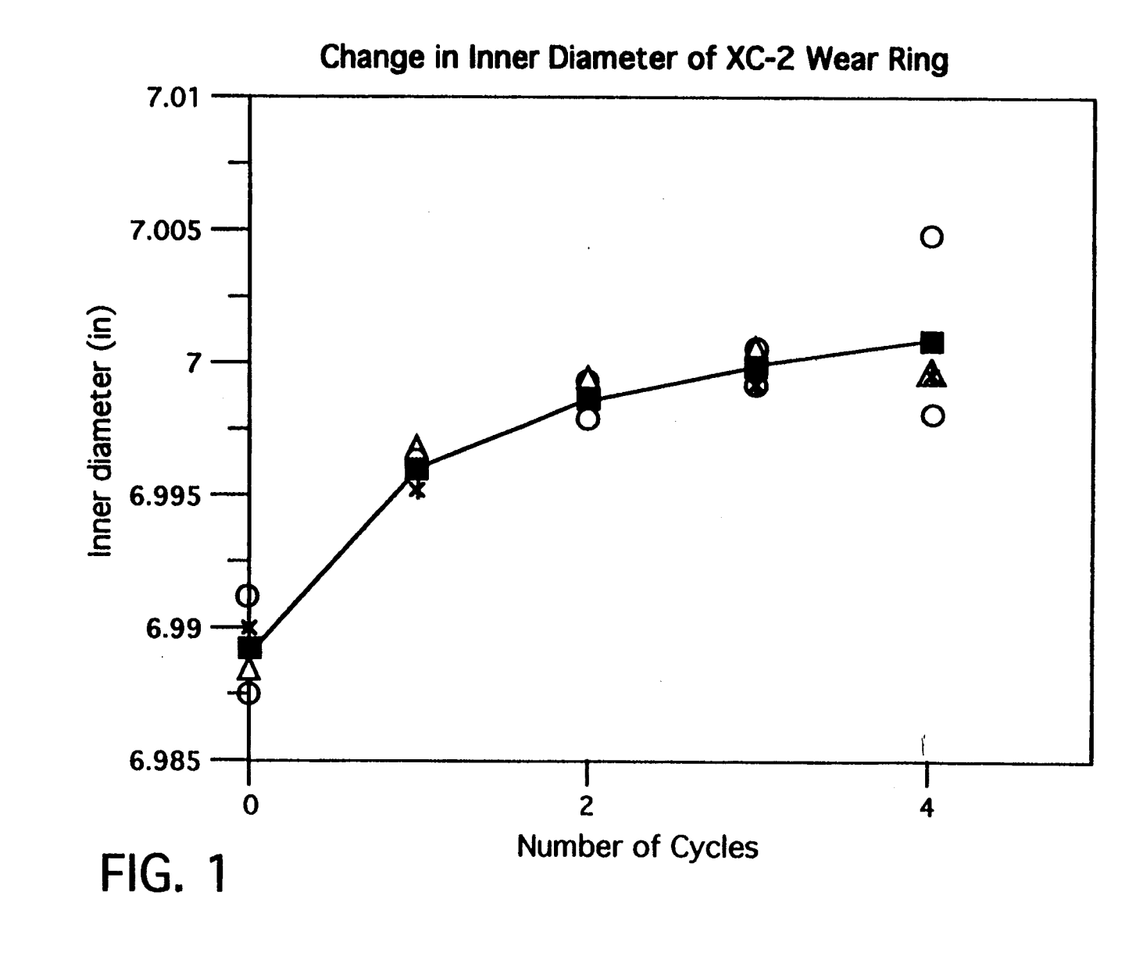
FIG. 1 is a graph illustrating the change in inside diameter for a non-isotropic wear ring of the prior art as a function of the number of cycles of heating through which the ring is put.

As illustrated in FIG. 1, it has been determined that there is some limiting deformation in the non-isotropic composite material in issue. The material of FIG. 1 comprised a PEEK/CF wear ring. Such material, when reinforced with wound fiber, behaves in a somewhat unusual manner, in that the inner diameter of the ring decreases as the object is heated. This effect is a result of the non-isotropy of the material and, in combination with the thermoplastic nature of the matrix, this can lead to a creep phenomenon which is not seen in isotropic, non-thermoplastic materials.

In view of the limiting deformation of the non-isotropic material, it should be possible to provide a process to cause an increase in the inner diameter of the ring to a degree similar to that observed at the limit illustrated by FIG. 1. This process, referred to herein as "annealing," would overcome the problem of creep by providing a ring that has been "pre-deformed" to a given diameter, and could be machined to a larger diameter.

For convenience in accomplishing the annealing process of the present invention, it is advantageous that the mandrel be the same mandrel that is used for the initial manufacture of the cylindrical member, or ring, although this is not strictly required.

According to the present method, a cylindrical thermoplastic member, such as a wear ring, bearing, washer, tube, or bushing, is fitted onto a mandrel, or shaft, to create an interference fit at the minimum operation temperature. This is accomplished by providing a mandrel having an outside diameter (at the minimum operating temperature) greater than the inside diameter (also at the miminum operating temperature) of the cylindrical member. The mandrel and/or cylindrical member is first cooled to the point of allowing the cylindrical member to be slipped onto the mandrel, providing the interference fit once the mandrel warms to the minimum operating temperature. The cylindrical member and mandrel are preferably sized to produce an interference fit, at the minimum operating temperature, of about 0.01' or less.

The cylindrical member is, as previously discussed, a composite of a non-isotropic material comprising a thermoplastic resin and a reinforcing fiber. The thermoplastic resin is preferably selected from the group consisting of polyether etherketone resins, polyketones, polyimides, polyamides, and polysulphones.

The cylindrical member is initially fabricated according to known methods that comprise no part of the present invention, and are adequately discussed in numerous publications relating to the preparation of fiber-reinforced thermoplastic resins. Processes for making PEEK/CF composites ("APC Materials") are adequately disclosed in U.S. Pat. Nos. 4,360,630; 4,559,262; 4,549,920; and 4,541,884, all of which are incorporated in their entireties by reference herein. These materials may be reinforced with any number of different fibers, such as carbon, glass, ceramic, and others. A typical composition comprises about 40% by weight thermoplastic resin and about 60% by weight reinforcing fiber.

Figure 4:
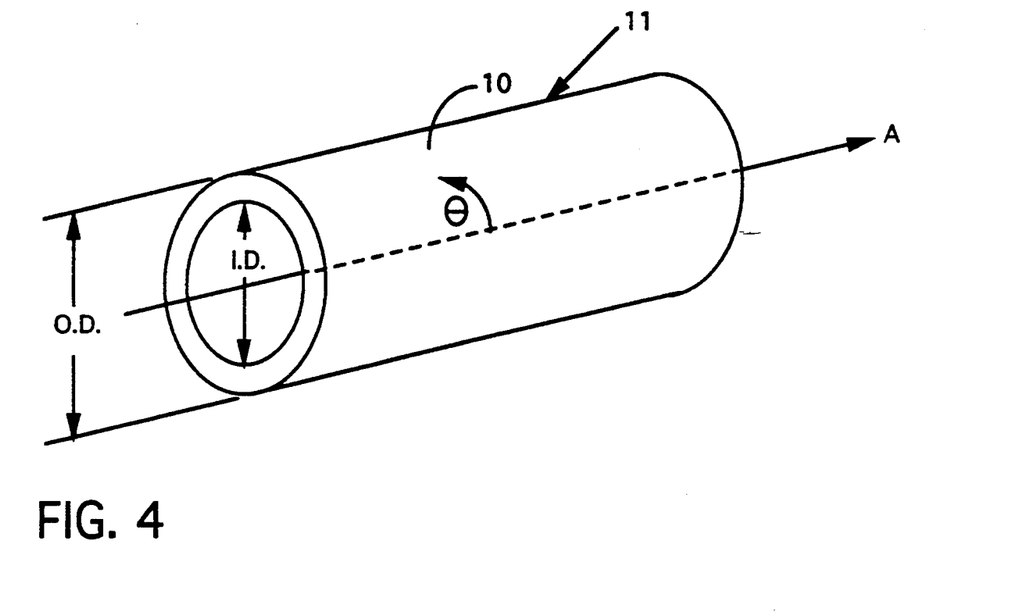
FIG. 4.is schematic isometric view of a cylinder illustrating reinforcement fiber winding geometrics relative to the axis of the ring.
Figure 4A:
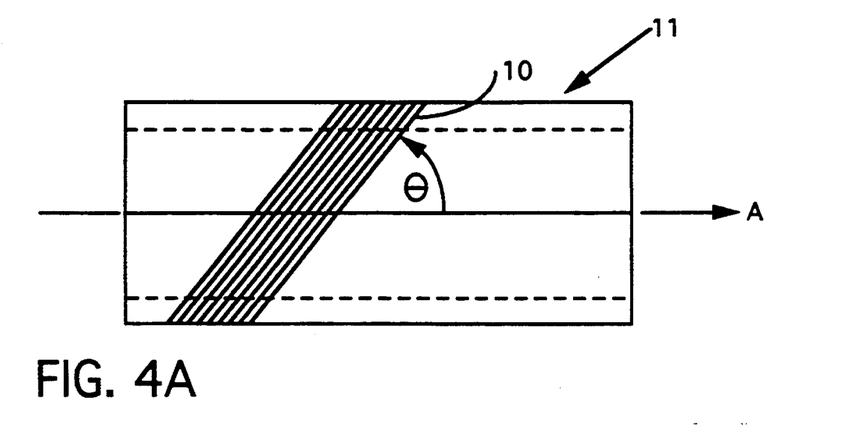
FIG. 4A is a side elevational view of the cylinder of FIG. 4.

In a preferred embodiment of the invention, the cylindrical member reinforcing fibers 10 are wound continuously, at an angle $\theta$ of between plus or minus 30° to 90° relative to the axis A of the cylindrical member 11, as illustrated in FIGS. 4 and 4A. In a highly preferred embodiment of the invention, the reinforcing fibers 10 comprise at least about 30% of the composite by weight.

The thermoplastic resin may comprise either a semi-crystalline polymer or an amorphous polymer. The type of polymer used dictates the temperature to which the system must be elevated to achieve the favorable results of the invention, as will hereinafter be described.

After a cylindrical member comprising a thermoplastic resin and a reinforcing fiber is selected, a mandrel having a higher coefficient of thermal expansion (CTE) than that of the non-isotropic composite is selected, the mandrel having an outside diameter greater than the inside diameter of the cylindrical member. As previously discussed, the cylindrical member is fitted onto the mandrel, for example, by cooling the mandrel and/or the cylindrical member and allowing the cylindrical member to be slid over the mandrel.

The "creep" which takes place in the cylindrical member is affected by several factors: the size of the mandrel relative to the ring, the temperature to which the system is heated (which controls the visco-elastic response of the ring), and the stress generated on the inside of the ring as a result of the pretreatment heating step. The stress itself is a function of the stiffness of the mandrel, the stiffnesses of the ring, the coefficient of thermal expansion of the mandrel, and the coefficients of thermal expansion of the ring.

The mandrel is preferably fabricated of a material capable of exerting significant internal pressure on the inside diameter of the cylindrical member when the mandrel is heated. For example, mandrels fabricated of metals selected from the group consisting of iron, aluminum, magnesium, titanium, nickel, zinc, and any alloys thereof can be used. Of course, the type of mandrel selected dictates the amount of thermal expansion the mandrel will experience at a given temperature, and may, therefore, dictate the maximum temperature to which the mandrel may be heated during the process of the present invention. In addition to thermal expansion, maximum continuous use temperature of the mandrel also affects the pressure that is applied to the cylindrical member by the mandrel during the pretreatment step of the invention.

It is recommended that the mandrel be of a solid material to maximize the applied stress. Most important, the mandrel must have a higher radial cooeficeint of thermal expansion than the ring and also a higher radial stiffness than the ring at the pretreatment elevated temperatures discussed hereinafter.

After the cylindrical member is fitted onto the mandrel, the mandrel and the cylindrical member are heated to an elevated temperature sufficient to cause thermal deformation of the mandrel and substantially irreversible thermal deformation of the cylindrical member. In the case of thermoplastic resins comprising a semi-crystalline polymer, this elevated temperature must be above the glass-rubber transition temperature ($T_g$) of the resin (PEEK $T_g=155°$ C.), but below the point at which the onset of melting of the resin occurs (310° C. for PEEK). It is necessary to force the ring to creep with the composite in the solid state, although at as high a temperature as possible. The higher the temperature, the faster the creep will take place, however, if the polymer goes into the melt, then the whole ring will flow. In the case of PEEK polymer on a steel mandrel, a temperature of about 582° F. (305° C.) is a reasonable upper limit for the pretreating temperature.

In the case of thermoplastic resins comprising amorphous polymers, (e.g., polyethersulfone $T_g=216°$ C. and polyetherimide $T_g=210°$ C.), the elevated temperature must be no greater than the glass-rubber transition temperature of the resin.

Once the mandrel and cylinder are heated to the appropriate elevated temperature, the pretreatment process is complete; it has been determined that it is not necessary to hold the pretreated cylinder at the elevated temperature for an extended time period, although this may be done optionally.

The temperature to which the mandrel is heated is dictated by the same variables discussed above with respect to the factors that affect "creep". In the case of the use of PEEK composites, and where the mandrel comprises a steel mandrel, a temperature of 582° F. (305° C.) is a preferred upper limit to avoid entering the melting region of the PEEK polymer, which melting starts at 310° C. at ambient pressures.

When aluminum is used for the mandrel, the higher strength aluminums are preferred, such as 6061 aluminum. The pretreatment elevated temperature for an aluminum mandrel is lower than for steel, about 500° F., as a result of the greater coefficient of thermal expansion of aluminum, which may provide a higher stress on the fitted cylindrical member, even at lower temperatures than required for steel mandrels.

The preferred lower limit to which the mandrel is heated during the pretreatment step for PEEK/CF composite is to an elevated temperature of at least about 400° F.

The method by which the elevated temperature is achieved is not critical to the invention. Satisfactory results have been achieved by placing the mandrel and the cylindrical member in a recirculating air oven. Following the heating step, the mandrel and cylindrical member are cooled, for example, by setting the oven to room temperature, and the pretreatment process is complete.

EXPERIMENTAL

Figure 3:
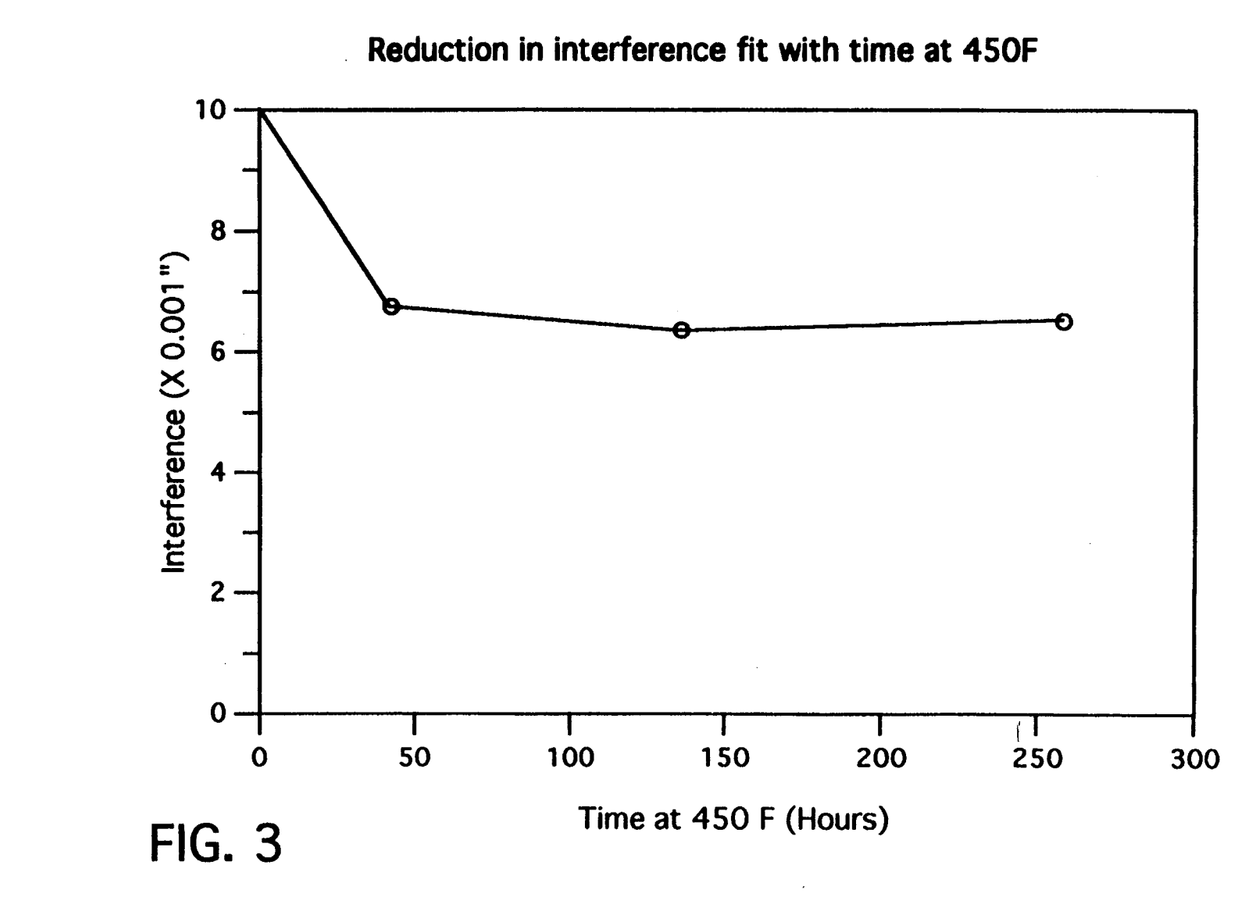
FIG. 3 is a graphical illustration showing the reduction in degree of interference fit with time of a wear ring on a typical impeller during continuous soaking at 450° F. after annealing the wear ring on a steel mandrel according to the method of the present invention.

It has been shown that for the specific case of the creep problem discussed herein, annealing of non-isotropic. thermoplastic cylindrical members on both steel and aluminum mandrels causes sufficient deformation to reduce the extent of creep in service to a degree which is acceptable to the end user. FIG. 3 shows the reduction in degree of interference fit of a wear ring on a typical impeller with time during continuous soaking at 450° F., after annealing according to the method of the present invention on a steel mandrel. It has been learned that any interference fit (i.e., greater than zero) is adequate, and the remaining interference in this case is more than sufficient.

Machining up to 0.1' from the internal diameter of an annealed wear ring does not remove the complete pretreatment effect—i.e., if fitted to an impeller with a 0.007' interference, some (and therefore sufficient) interference remains even after soaking at 450° F.

The problem is to prevent the wear ring or other cylindrical members from increasing in internal diameter in service to a degree which is so great that the ring leaves the shaft. In order to determine the cause and better understand the mechanics of the deformation, three studies were initiated.

(1) Using a numerical analysis technique known as the Finite Element Method (FE), a series of computer models of wear rings were constructed, and their deformation as a result of heating examined. These models revealed that a composite hoop with the fiber orientation often used in wear rings, i.e., continuous winding at an angle of ±88° relative to the axis of the ring, behaves in a rather unusual manner, in that the inner diameter of the ring decreases as the object is heated. This effect is not seen in "conventional" wear rings, which tend to be isotropic (or near-isotropic) in nature—and therefore undergo an inner diameter increase during heating.

Hence, when a non-isotropic cylinder such as a wear ring is placed on a metallic impeller, which increases in overall size as it is heated, there is the potential for extremely high stresses to be generated. The predicted magnitude of these stresses is a factor of three greater than one would calculate using available isotropic analyses. See, e.g., E J Hearn, , "Mechanics of Materials, Volume 1", Chs. 9 & 10, Pergammon International, 1977, incorporated by reference in its entirety herein. Knowledge of the magnitude and sense of the stress field thus generated allow the most likely cause of the deformation to be identified, which is considered to be the radial stress in the system.

Given that it is the mismatch in coefficients of thermal expansion (CTEs) which cause the stress, consideration was given to manufacturing rings which had a CTE similar to that of the impeller. While this is possible, it is economically unattractive, and the option was not pursued.

Figure 5:
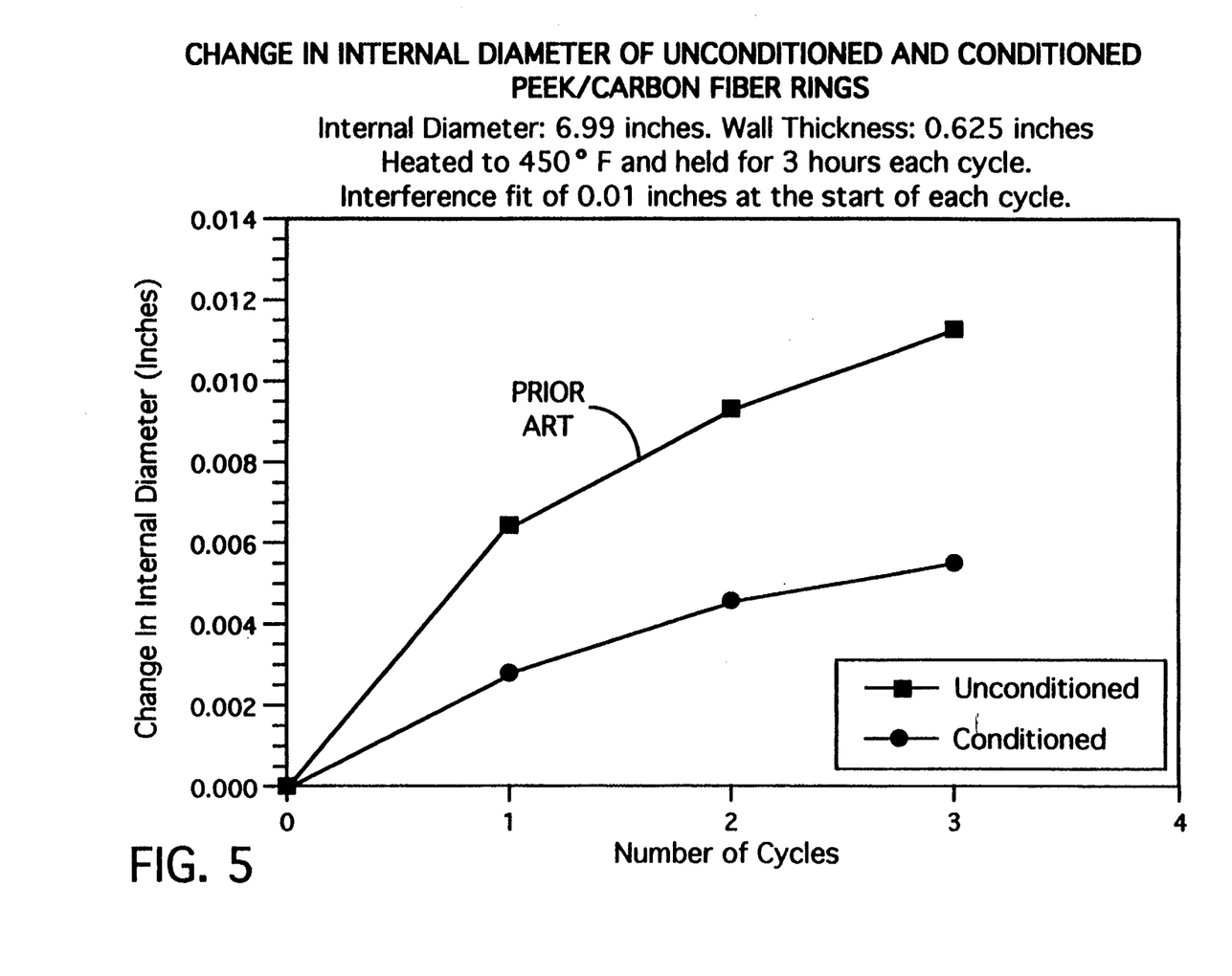
FIG. 5 is a graphical illustration comparing the change in internal diameter of a ring without preconditioning to an identical ring preconditioned according to the methods of the present invention.

(2) A test program was initiated which examined the extent of growth of wear rings on a real impeller. FIG. 1 shows the change in inner diameter of a wear ring during one of the long-term experiments. In this case, a wear ring was fitted to the impeller using a 0.01' interference fit (i.e., the diameter of the shaft was built up using strips of metal such that it was 0.01' greater than the inner diameter of the wear ring). The assembly was heated to 450° F., held for three hours, then cooled and the new inner diameter of the ring examined. The process was repeated a number of times, and as is apparent from FIG. 1, the inner diameter eventually ceased to change. This led to the conclusion that there is some limitation in the extent to which a PEEK/CF ring of this type can be deformed. FIG. 5 illustrates the favorable results of the pretreatment method of the present invention. As illustrated, an unconditioned ring of the prior art experiences approximately double the amount of change in internal diameter upon heating to 450° F. and soaking for three hours relative to an identical ring preconditioned according to the method of the present invention given the same 450° F. soak following pretreatment.

Figure 2:
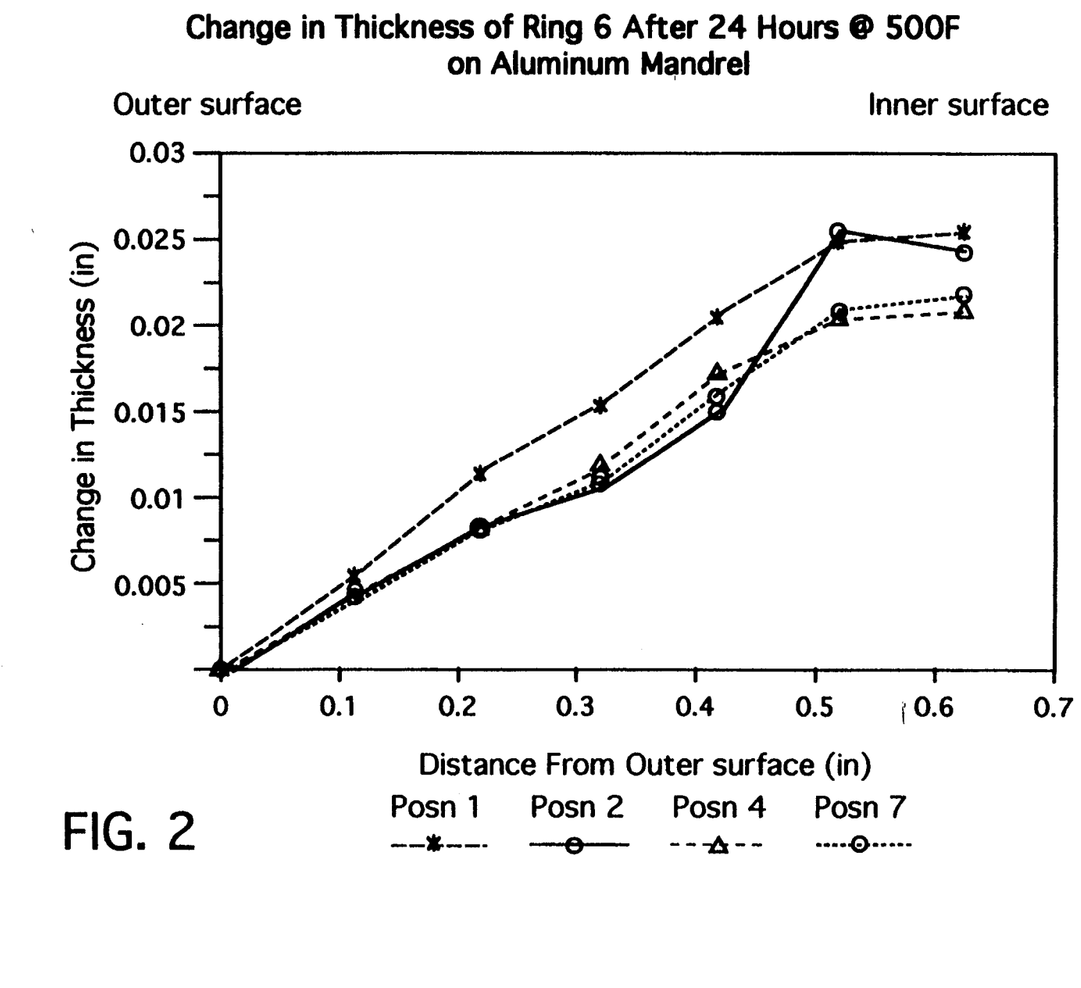
FIG. 2 is a graphical illustration of the change in thickness of a ring of a non-isotropic composite of the prior art on an aluminum mandrel after twenty-four hours at 500° F. as a function of the distance of the outer surface of the mandrel from the inner surface of the ring.

Further, examination of the ring after testing revealed that the material closest to the impeller had flowed outwards under pressure, leading to a pronounced thickening of the ring near to the inner diameter. A typical profile is shown in FIG. 2. Hence, it was concluded that radial pressure-induced transverse flow was the mechanism by which the ring deformed. The available literature contains one detailed examination of transverse flow in PEEK/CF during processing. See, e.g., J. A. Barnes and F. N. Cogswell "Transverse Flow Processes in Continuous Fibre Reinforced Thermoplastics" Composites 20, 1, 38–42 (1989), incorporated in its entirety by reference herein, which also reports some limiting deformation.

A PEEK/CF wear ring having an inside diameter of 6.99' and a wall thickness of 0.625' was pretreated according to the herein disclosed method. The inner diameter was prestretched by approximately 0.02' to provide an interference fit of about 0.01' at room temperature. This wear ring was tested in continuous service at 450° F. on steel impellers with the 0.01' or smaller interference fit at room temperature. No creep was experienced during this continuous service test, as evidenced by the maintenance of a greater that zero interference fit even after 250 hours of soaking at 450° F., as illustrated in FIG. 3.

Although the invention has been described in detail in the foregoing for the purpose of illustration, it is to be understood that such detail is solely for that purpose and that variations can be made therein by those skilled in the art without departing from the spirit and scope of the invention as defined by the claims.

We claim:

1. A method of preconditioning a cylindrical member capable of being fitted onto a mandrel to create an interference fit at a minimum operating temperature, said mandrel having an outside diameter greater than the inside diameter of said cylindrical member at the minimum operating temperature, including the steps of:
   (a) providing a cylindrical member of a non-isotropic composite of a thermoplastic resin and a reinforcing fiber;
   (b) providing a mandrel having an outside diameter greater than the inside diameter of said cylindrical member at the minimum operating temperature;
   (c) cooling said mandrel and/or cylindrical member, thereby allowing said cylindrical member to be fitted onto said mandrel;
   (d) heating said mandrel and said fitted cylindrical member to an elevated temperature sufficient to cause thermal deformation of said mandrel and substantially irreversible thermal deformation of said cylindrical member, said mandrel having a higher radial coefficient of thermal expansion and higher radial stiffness than that of said non-isotropic composite at said elevated temperature; and
   (e) cooling said mandrel and cylindrical member.

2. The method of claim 1 wherein said mandrel is used for manufacturing said cylindrical member prior to said preconditioning.

3. The method of claim 1 wherein said cylindrical member is a product selected from the group consisting of wear rings, bearings, washers, tubes, and bushings.

4. The method of claim 1 wherein said thermoplastic resin is selected from the group consisting of polyketones, polyimides, polyamides, and polysulphones.

5. The method of claim 1 wherein said thermoplastic resin is PEEK.

6. The method of claim 1 wherein said reinforcing fiber is selected from the group consisting of carbon, glass and ceramic fiber.

7. The method of claim 1 wherein said nonisotropic composite comprises 40% of said thermoplastic resin and 60% of said reinforcing fiber, and said reinforcing fiber is carbon.

8. The method of claim 1 wherein said mandrel is heated in step (d) to an elevated temperature of at least about 400° F.

9. The method of claim 1 wherein said reinforcing fibers are wound continuously, at an angle of plus or minus about 30°–90° relative to the axis of said cylindrical member.

10. The method of claim 1 wherein said reinforcing fibers comprise at least about 30% of said composite.

11. The method of claim 1 wherein said mandrel is fabricated of a material capable of exerting significant internal pressure on said cylindrical member at said elevated temperature.

12. The method of claim 11 wherein said mandrel material is selected from the group consisting of iron, aluminum, magnesium, titanium, nickel, zinc, and any alloys thereof.

13. The method of claim 5 wherein said mandrel is fabricated of steel and said elevated temperature is at most about 582° F.

14. The method of claim 5 wherein said mandrel is fabricated of high temperature aluminum and said elevated temperature is at most about 500° F.

15. The method of claim 1 wherein said cylindrical member and said mandrel are sized to produce an interference fit, at ambient temperatures, of about 0.01 inches or less.

16. The method of claim 1 wherein said elevated temperature is achieved by placing said mandrel and said cylindrical member in a recirculating air oven.

17. The method of claim 1 wherein said thermoplastic resin comprises a semi-crystalline polymer and said elevated temperature is above the glass-rubber transition temperature of said resin, but below the point at which onset of melting of said resin occurs.

18. The method of claim 1 wherein said thermoplastic resin comprises an amorphous polymer, and said elevated temperature is no greater than the glass-rubber transition temperature of said resin.

* * * * *